US011244191B2

(12) United States Patent
Yao et al.

(10) Patent No.: US 11,244,191 B2
(45) Date of Patent: Feb. 8, 2022

(54) REGION PROPOSAL FOR IMAGE REGIONS THAT INCLUDE OBJECTS OF INTEREST USING FEATURE MAPS FROM MULTIPLE LAYERS OF A CONVOLUTIONAL NEURAL NETWORK MODEL

(71) Applicant: INTEL CORPORATION, Santa Clara, CA (US)

(72) Inventors: Anbang Yao, Beijing (CN); Tao Kong, Beijing (CN); Yurong Chen, Beijing (CN)

(73) Assignee: Intel Corporation, Santa Clara, CA (US)

( * ) Notice: Subject to any disclaimer, the term of this patent is extended or adjusted under 35 U.S.C. 154(b) by 225 days.

(21) Appl. No.: 16/070,483

(22) PCT Filed: Feb. 17, 2016

(86) PCT No.: PCT/CN2016/073943
§ 371 (c)(1),
(2) Date: Jul. 16, 2018

(87) PCT Pub. No.: WO2017/128376
PCT Pub. Date: Aug. 3, 2017

(65) Prior Publication Data
US 2019/0073553 A1 Mar. 7, 2019

(51) Int. Cl.
*G06K 9/46* (2006.01)
*G06K 9/32* (2006.01)
(Continued)

(52) U.S. Cl.
CPC ............. *G06K 9/46* (2013.01); *G06K 9/3233* (2013.01); *G06K 9/628* (2013.01); *G06K 9/6232* (2013.01);
(Continued)

(58) Field of Classification Search
CPC ........ G06K 9/46; G06K 9/6232; G06K 9/628; G06K 9/6256; G06K 9/3233; G06N 3/082; G06N 3/08; G06N 3/0454
See application file for complete search history.

(56) References Cited

U.S. PATENT DOCUMENTS

| 10,019,642 B1 | 7/2018 | Michelini et al. |
| 2008/0304740 A1 | 12/2008 | Sun et al. |

(Continued)

FOREIGN PATENT DOCUMENTS

| CN | 104036323 | 9/2014 |
| CN | 104217225 A | 12/2014 |

(Continued)

OTHER PUBLICATIONS

Ronneberger, Olaf, Philipp Fischer, and Thomas Brox. "U-net: Convolutional networks for biomedical image segmentation." International Conference on Medical image computing and computer-assisted intervention. Springer, Cham, 2015. (Year: 2015).*

(Continued)

*Primary Examiner* — Menatoallah Youssef
(74) *Attorney, Agent, or Firm* — Hanley, Flight & Zimmerman, LLC

(57) ABSTRACT

Region proposal is described for image regions that include objects of interest. Feature maps from multiple layers of a convolutional neural network model are used. In one example a digital image is received and buffered. Layers of convolution are performed on the image to generate feature maps. The feature maps are reshaped to a single size. The reshaped feature maps are grouped by sequential concatenation to form a combined feature map. Region proposals are generated using the combined feature map by scoring (Continued)

bounding box regions of the image. Objects are detected and classified objects in the proposed regions using the feature maps.

20 Claims, 8 Drawing Sheets

(51) Int. Cl.
*G06N 3/04* (2006.01)
*G06K 9/62* (2006.01)
*G06N 3/08* (2006.01)

(52) U.S. Cl.
CPC ......... *G06K 9/6256* (2013.01); *G06N 3/0454* (2013.01); *G06N 3/08* (2013.01); *G06N 3/082* (2013.01)

(56) References Cited

U.S. PATENT DOCUMENTS

| 2011/0182469 | A1 | 7/2011 | Ji et al. |
| 2015/0078654 | A1 | 3/2015 | Chaudhury et al. |
| 2018/0211099 | A1* | 7/2018 | Ranjan ............... G06K 9/00248 |

FOREIGN PATENT DOCUMENTS

| CN | 104517103 | 4/2015 |
| CN | 104572804 A | 4/2015 |
| CN | 104573731 | 4/2015 |
| CN | 104794527 | 7/2015 |
| CN | 104809443 | 7/2015 |
| CN | 104866868 | 8/2015 |
| CN | 105120130 | 12/2015 |
| CN | 105138973 | 12/2015 |

OTHER PUBLICATIONS

International Preliminary Reporton Patentability received for PCT Patent Application No. PCT/CN2016/073943, dated Aug. 30, 2018, 6 pages.
State IP Office of the PR China—International Search Report of the International Searching Authority for International Application No. PCT/CN2016/073943 dated Nov. 18, 2016, 3 pgs.
State IP Office of the PR China—Written Opinion of the International Searching Authority for International Application No. PCT/CN2016/073943 dated Nov. 18, 2016, 4 pgs.
Girshick, et al., "Region-based Convolutional Networks for Accurate Object Detection and Segmentation." IEEE Transactions on Pattern Analysis and Machine Intelligence., vol. 38, No. 1, Jan. 1, 2016—pp. 1-16.
Ren et al., "Faster R-CNN—Towards Real-Time Object Detection with Region Proposal Networks," Sep. 13, 2015, 10 pages.
Ren et al., "Object Detection Networks on Convolutional Feature Maps," Apr. 23, 2015, 9 pages.
Ren et al., "Object detection via a multi-region & semantic segmentation-aware CNN model," Sep. 23, 2015, 17 pages.
Chinese Patent Office, "Office action," issue in connection with Chinese patent application No. 201680079183.8, dated Jul. 30, 2021, 15 pages. Machine translation.

* cited by examiner

REGION PROPOSAL FOR IMAGE REGIONS THAT INCLUDE OBJECTS OF INTEREST USING FEATURE MAPS FROM MULTIPLE LAYERS OF A CONVOLUTIONAL NEURAL NETWORK MODEL

CROSS-REFERENCE TO RELATED APPLICATION

This patent application is a U.S. National Phase application under 35 U.S.C. § 371 of International Application No. PCT/CN2016/073943, filed on 17 Feb. 2016, entitled REGION PROPOSAL FOR IMAGE REGIONS THAT INCLUDE OBJECTS OF INTEREST USING FEATURE MAPS FROM MULTIPLE LAYERS OF A CONVOLUTIONAL NEURAL NETWORK MODEL, the contents of which are incorporated herein by reference.

FIELD

The present description relates to the field of object detection for machine vision or image understanding and, in particular, to proposing image regions potentially including objects of interest using feature maps from multiple convolutional layers of a Convolutional Neural Network model.

BACKGROUND

Many computers, personal devices, wearables, and other computing systems include image or video capture or are equipped to process images or video. With the proliferation of digital cameras in portable, ruggedized, mounted, and desktop devices, there is a related desire to use these cameras in new ways. Some of these ways work by detecting objects that are within the camera's field of view. Once an object is identified, many different operations may be performed, depending on the categories of objects and the purpose for the system.

Generic object detection techniques automatically recognize and localize the instances of objects that appear in an image or a video frame. In many cases, the technique only detects objects that fall within particular categories or classes that are of interest for other tools. As an example, a system may recognize and localize people but not trees. The same system may also recognize and localize particular animals. An object recognition system may then classify each animal based on the type of animal. Object detection may be considered to be a fundamental task in computer vision with a broad range of different applications. These applications include scene understanding, image search, augmented reality, surveillance, autonomous driving and so on. These applications are becoming prevalent and diverse, especially on mobile devices and other devices with embedded cameras. High accuracy and high speed object detection is important in personal, home, business, professional, and industrial fields.

BRIEF DESCRIPTION OF THE DRAWINGS

Embodiments are illustrated by way of example, and not by way of limitation, in the figures of the accompanying drawings in which like reference numerals refer to similar elements.

DETAILED DESCRIPTION

Figure 1:
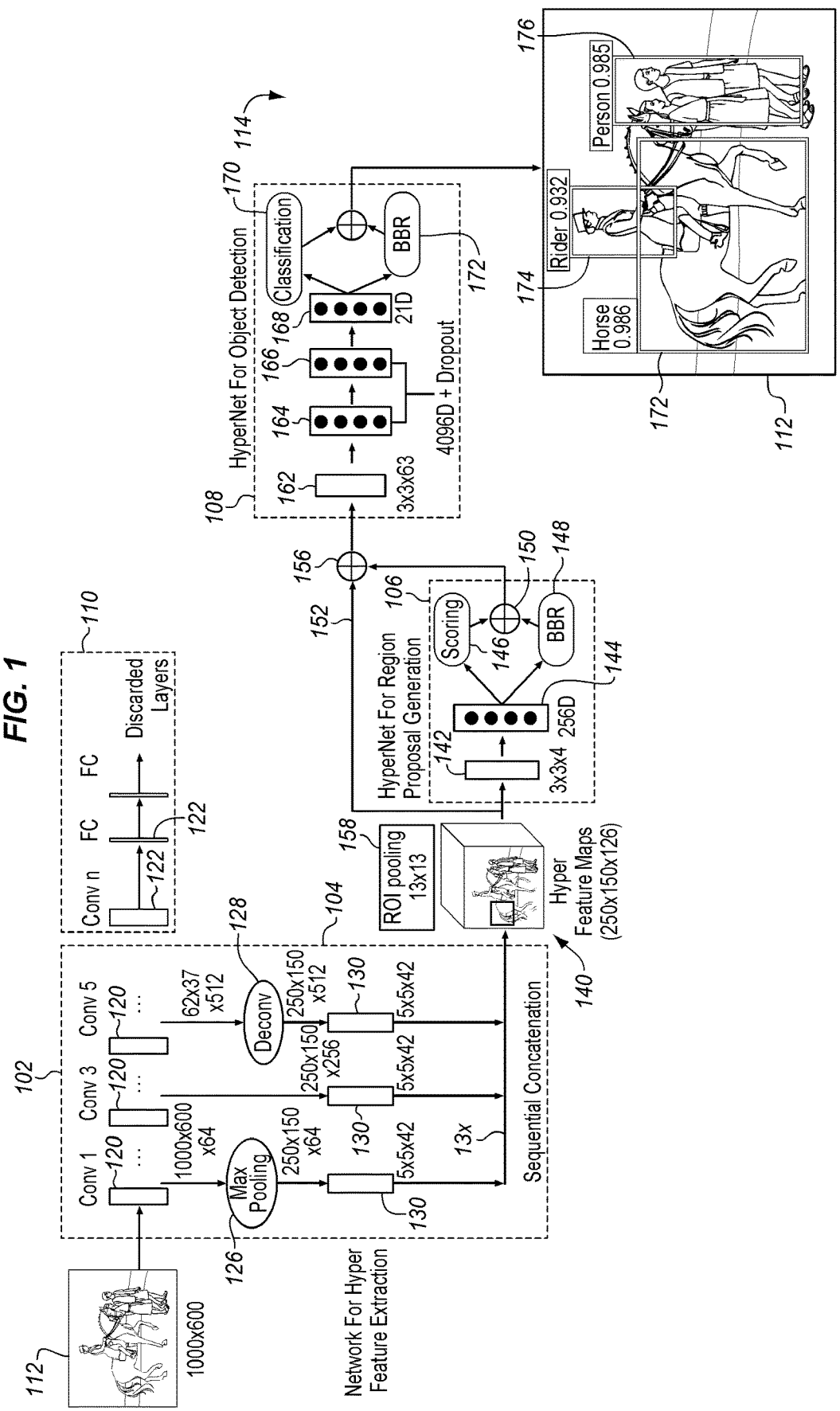
FIG. 1 is a block diagram of an example system including a net for feature extraction, a net for region proposal generation, and a net for object detection and classification according to an embodiment.

High accuracy and high speed generic object detection is described using a novel HyperNet technology. This object detection may be applied to deep learning applications. A robust Hyper Feature is described that combines low-level, middle-level, and high-level convolutional feature maps of a pre-trained convolutional neural network model over the entire image. The Hyper Feature is extracted first with a well-designed network. As a result, the technique provides impressively good feature discrimination. Taking this Hyper Feature as the input, two novel HyperNet architectures are described, one for region proposal generation and the other for object detection. Finally the region proposal generation and object detection are integrated into a unified HyperNet framework. The unified HyperNet framework may be built using a novel end-to-end joint training method which shares Hyper Features both for generating region proposals and detecting object instances. This integration benefits from a novel end-to-end joint training method presented to share Hyper Features across the two tasks.

There are two primary types of offline trained object classifiers: sliding window based classifiers; and region proposal based classifiers. In the sliding window strategy object classifiers are separately evaluated at evenly spaced positions with various scales over the entire image. The position and scale define each window. There can be millions of sliding windows to evaluate in a test image, imposing a heavy computational burden. One region proposal based technique is Regions with Convolutional Neural Network (R-CNN) which provides better accuracy and less computational burden.

R-CNN uses a region proposal method called Selective Search (SS) to first generate thousands of potential image regions by hierarchical segmentation and grouping. Object detection is performed only in the proposed image regions by classifying the respective CNN features. The computational load is reduced by limiting object detection to the proposed regions instead of performing object detection in all possible regions. Another region proposal method is Edge Boxes (EB) which mainly uses detected edges to propose image regions. However even with SS and EB there may still be thousands of proposed image regions. Reducing the number of proposed image regions may cause objects to be missed. In addition, each proposed image region is resized to some fixed size in order to run the related CNN features and object classifiers. In addition, the region proposals are generated separately from the object detection and the CNN features are each classified sequentially.

Using the described techniques, features, architecture, and framework, a higher object recall rate with higher mean Average Precision (mAP) is obtained. This may be done using far fewer region proposals, such as ⅙ or even 1/40 of the region proposals used with other techniques. Accuracy may be further improved by using more region proposals. With this significant improvement in precision and speed object detection may be performed on small devices in real time as video frames are received. This allows for many new applications.

FIG. 1 is an overview block diagram of an example of a HyperNet system. There are three primary modules: a novel network 102 and 104 for Hyper Feature extraction; a HyperNet architecture 106 for region proposal generation; and a HyperNet architecture 108 for object detection. These are described in more detail below. An example of an end-to-end joint training strategy for integrating these three modules into a unified HyperNet framework is described in the context of FIG. 2.

1. Network for Hyper Feature Extraction

The network 102 for Hyper Feature extraction provides robust features to represent image regions. The features are then used for region proposal generation and object detection. In region proposal generation, a good feature clearly discriminates all objects of interest from the background. In object detection, a good feature clearly discriminates different object classes from each other. The described Hyper Feature has these properties and is also computationally efficient. The Hyper Feature is partially motivated by the fact that deep CNN (Convolutional Neural Network) features are more representative than hand-crafted features. Moreover, the feature maps of convolutional layers of a CNN model have hieratically sematic meanings (e.g., edges, local parts and global shapes), but the feature maps are different in size, i.e. width, height, and depth. The Hyper Feature is a feature that flexibly integrates sematic-specific convolutional feature maps of a pre-trained CNN model into a uniform space to represent the entire image.

The network 102 of FIG. 1 extracts features using at least four parts. An input image 112 is first resized to some standard scale. In this example, the image is downsized to 1000×600 pixels. However, the image may instead be upsized or downsized to any other suitable size and aspect ratio, depending on the camera, the system, and the intended use of the object detection. The resized image is then provided to the network in which the first operation is directly initialized as the first N convolutional layers of a pre-trained CNN model. As shown only some of the layers are necessary. In this example, the first, third and fifth convolutional layers 120 are used. These layers have a fine, medium, and coarse resolution as shown. This corresponds to a low, middle, and high level semantical meaning. In the feature maps, fine resolution (from a shallow layer) corresponds to low level semantical meaning, but coarse resolution (from a deep layer) has a more high level semantical meaning. All of the unused or otherwise unnecessary layers 122 are discarded at box 110.

In this example the depth of the convolutions N has been set to N=5. The outputs of the first part are the feature maps from the $1^{st}$, $3^{rd}$ and $5^{th}$ convolutional layers, not just the feature maps from the $5^{th}$ convolutional layer nor the feature maps from all 5 convolutional layers. In other words in the first part 102, low level, middle level and high level convolutional feature maps 120 are captured in a parallel way, i.e. at the same time.

In this example, the sizes of the feature maps from the $1^{st}$, $3^{rd}$ and $5^{th}$ convolutional layers have different dimensions, or different numbers of pixels. They have a high, middle, and low pixel scale. In this example, the first, low level convolutional map has a high pixel density or scale at 1000×600×64. This is the same as the input image at 1000×600 with an additional 64 channels for the z-coordinate from the convolution. The middle level convolutional map has a lower resolution at 250×150×256. This represents a downscaled image and an increased number of channels. The high level convolution has a still lower resolution and still more channels at 62×37×512.

In the second part the feature maps are concatenated 104. Before this is done, the sizes of the feature maps are conformed. In this example, the low and high level maps are conformed to the size of the middle level map in width (x) and height (y) but not in depth (z), however, the feature maps may instead be conformed to the low or high level map or to some other size, depending on the implementation. There are a variety of different techniques to conform the sizes of the feature maps. As shown in this example, pooling 126 is used to pool the maximum value pixels and thereby reduce the resolution. This may be a 2×2 max pooling, for example. Deconvolution 128 is applied to the high-level feature map. In this case a 4× deconvolution is run on the feature maps from the fifth layer. This increases the resolution to that of the middle level or third layer feature map. The feature maps may be upscaled or downscaled in any of a variety of different ways. This approach allows for higher efficiency and discrimination after the layers are concatenated 130.

After conforming the sizes of the feature maps, the relative sizes are 250×150×64, 250×150×256, and 250×150×512, for the $1^{st}$, $3^{rd}$, and $5^{th}$ convolution respectively. The third part further performs compression on them using 5×5×42 convolutional kernels 130. This conforms the depth (z) of the feature maps to the same size. While 42 has been selected, any other depth may be used, depending on the implementation. These operations of the network for Hyper Feature Extraction produce three 3D feature maps each with the same size 250×150×42. The last part is a sequential concatenation. The further compressed convolutional feature maps are then concatenated 132 to produce the Hyper Feature Maps 140. With the described network, the respective Hyper Features (having a standard size of 250×150×126) is computed over input images efficiently. This type of Hyper Features may be used as the image representation in both region proposal generation and object detection. Any of the parameters used in this example HyperNet framework can be changed for different applications or implementations for region proposal generation, for object detection, or for both.

2. HyperNet Architecture for Region Proposal Generation

Once the Hyper Features over each input image are extracted and the Hyper Feature Maps 140 are obtained, then the region proposals are generated at a first HyperNet 106. This is the Hyper Net for region proposal generation. This HyperNet uses a Hyper Feature based CNN. Unlike some region proposal methods which may use 2000 or more proposals to guarantee a high recall rate, the region proposal HyperNet 106 can obtain an improved recall rate using only tens of proposals (e.g., 50) due to the impressive discrimination of the Hyper Feature extraction described herein.

The architecture of one example of a HyperNet 106 is shown in FIG. 1. With the Hyper Features extracted from an input image, the first layer of the region proposal HyperNet is a 13×13 Region of Interest (RoI) Pooling 158. In each source image, a number of RoIs at fixed locations, e.g. 20,000 RoIs, may be generated and their locations may then be projected onto the Hyper Features 140. Details of the RoI pooling are described in more detail below.

The RoIs can have different sizes and aspect ratios, and can be projected back to the source image with specific locations. A 13×13 RoI Pooling layer operates Max Pooling over each RoI with an adaptive cell size, and produces a 13×13×126 feature map. The RoI Pooling 158 is directly run on the Hyper Features. It may be computed only once for the entire image making it very efficient. The subsequent layers are a 3×3×4 convolution 142. This is used to provide a 256-channel Fully Connected (FC) layer 144 without random dropout. The dimension of the feature vector outputted from the FC layer is 256, and it is then fed into two sibling layers. The first layer 146 is for Objectness scoring and the other layer 148 is for Bounding Box Regression (BBR).

The Objectness score 146 may be determined in a variety of different ways and indicates the likelihood that the region contains an object. One such approach is a softmax function. The BBR allows the bounding box for each possible object to be refined. These two elements are combined 150 to produce a region proposal. As a result, a real-valued score is obtained for each RoI. The score is a measure of the probability that the RoI includes an object instance and also a respective location offset. Each RoI corresponds to a specific region proposal in the source image. This uses the end-to-end joint training method of FIG. 2.

3. HyperNet Architecture for Object Detection

The architecture of the second HyperNet 108 for object detection is coupled to the output 152 of the RoI pooling 158 and the output of the region proposal generation 106. These are combined 156 for the input to the second HyperNet 108. The architecture as shown is similar to that of the region proposal generation HyperNet 106. With the Hyper Features extracted at 104 from an input image, the object detection HyperNet first runs a 13×13 ROI pooling 158 over each of the region proposals (e.g., if M is the number of proposals, then M=50, or any other desired number). After the pooling, the subsequent layers are a 3×3×63 convolution 162. This is followed by three Fully Connected layers (FCs) in succession. The first is a 4096-channel FC 164 with random dropout. This is followed by a second 4096-channel FC 166 with random dropout and then by a 21-channel FC 168 without random drop out.

While a 21 channel FC and two 4096 channel FCs are mentioned here by way of example, other numbers may be used for different implementations and applications. The 21 channels herein refer to 20 different object categories. One additional category is defined for the background. The background corresponds to a non-object category of interest. Alternatively, if there were to be 100 object categories, then there would be a 101-channel FC without random drop out. The number 4094 is the dimension of the output of the fully connected layer. Since detection is more difficult than region proposal generation, a large number 4096 is set. This is much larger than the 256 that was proposed for region proposal generation. Other numbers may be used instead, 1024, 2048, etc. may be particularly useful in some embodiments.

Finally, the object detection HyperNet 108 outputs two vectors for each RoI. This RoI corresponds to a specific region proposal in the source image. The first vector is a classification 170 and the second vector is a BBR 172. These two vectors are combined 174 to provide object detection and classification for the original image. The classification identifies a detected object as a member of a particular class. There may be any number of different classes including a background class for background objects. There are a variety of different classification approaches. In one example, classification probabilities are obtained from a softmax function and then the most probable classification is chosen. The BBR determines an appropriate bounding box for the object. There may be different location offsets for different object classifications.

The final image 114 has bounding boxes for each of three detected objects. A first bounding box 172 is proposed around a first detected object which in this case is a horse. The object may be classified as a horse, a quadruped, an animal or in some other suitable class, depending on the nature of the system and its intended use. The size of the bounding box and the location offset around the object are determined as appropriate for a horse or other class if the object is in another class. The second bounding box 174 is around a second detected object which in this case is a horse rider (i.e. a person). The third bounding box 176 is around a third object which in this case is a standing person. In this example, there are two people standing close to each other side-by-side. The system may identify this as two persons, but in this case has identified only a single person because the two overlap from the perspective of the camera. Each bounding box is associated with a class, such as horse, rider, or person, and a probability that the classification is correct.

4. End-to-End Joint Training for Building Unified HyperNet Framework

Figure 2:
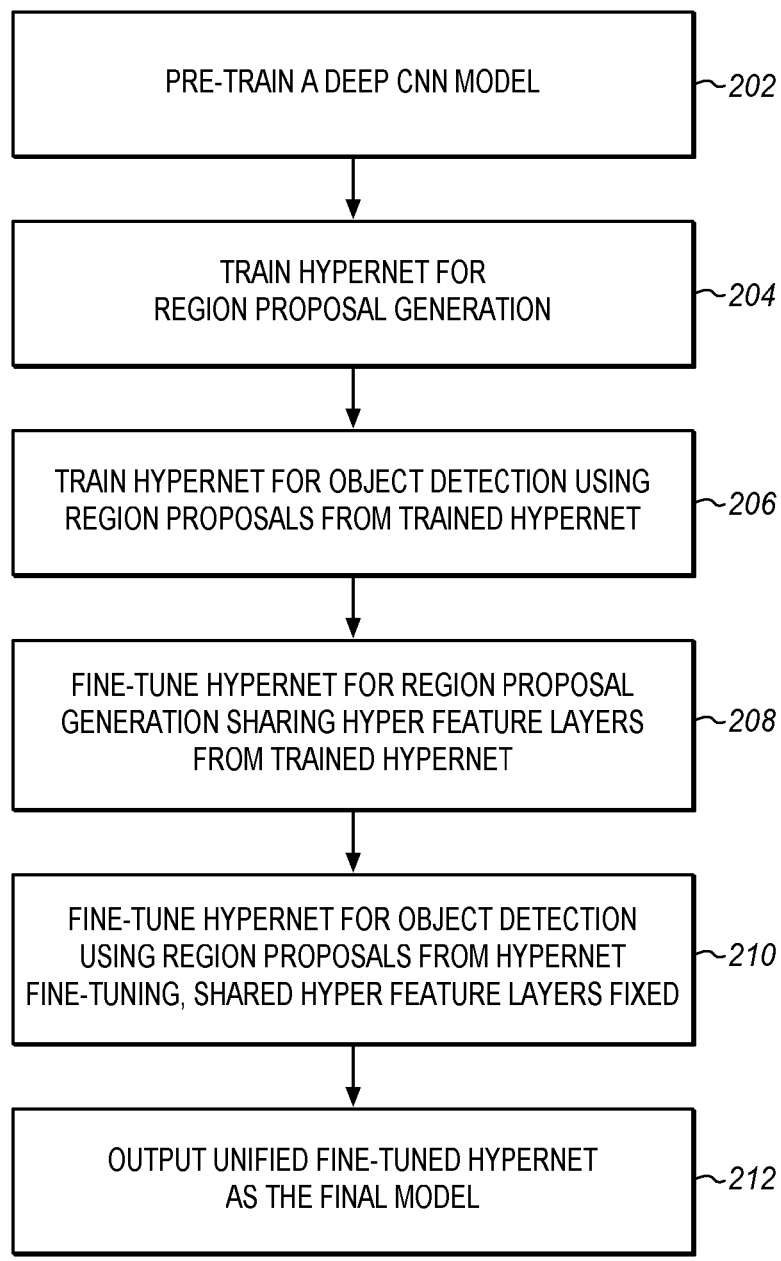
FIG. 2 is a process flow diagram of end-to-end joint training of the nets of FIG. 1 according to an embodiment.

As mentioned above, region proposal generation and object detection are unified into a single HyperNet framework. This is done in part using a novel end-to-end joint training method. FIG. 2 is a process flow diagram of an example of joint training.

The process of FIG. 2 starts at 202 with pre-training a deep CNN model, such as the VGGNet model (proposed by the Visual Geometry Group of University of Oxford), using a large scale object classification dataset such as ImageNet. The pre-trained model is used in part to initialize the first part of Hyper Feature extraction network 104. Any other type of training may be used, depending on the particular implementation.

In embodiments, the pre-training is carried out by optimizing the multinomial logistic regression objective using mini-batch gradient descent with momentum. The batch size and momentum are set and the training is regularized for the first two fully-connected layers. The pre-training is used for initializing the basic layers in the next two operations 204, 206.

At 204 a complete region proposal generation HyperNet 106 is trained. This may also include the Hyper Feature extraction network for region proposal.

At 206, a complete object detection HyperNet 108 is trained. The region proposals from block 204 may be used in ROI pooling to train object detection HyperNet including the Hyper Feature extraction network for object detection.

At 208 the region proposal HyperNet training is fine-tuned. The Hyper Feature extraction network trained in at 204 is replaced with the Hyper Feature extraction network trained at 206. The remaining layers of the complete region proposal HyperNet are then fine-tuned.

At 210, the object detection HyperNet is fine-tuned. The region proposals from 208 obtained in ROI pooling are used while the Hyper Feature extraction network is not changed.

In some embodiments, this operation is the same as that at 208 except that the remaining layers of the object detection HyperNet are fine-tuned.

At 212 the unified HyperNet is output as the final model. The combined fine-tuned HyperNet 106, 108 trained at 208, 210 is able to jointly handle region proposal generation and object detection.

Due to the training steps of FIG. 2, the Hyper Features are shared across two tasks, and the region proposals generated in each image are used in ROI pooling of the HyperNet for object detection. Therefore, the unified HyperNet can naturally process region proposal generation and object detection in one single run.

In some implementations, the data for training and testing the region proposal HyperNet are collected as follows: (1) for region proposal scoring, samples having >0.45 Intersection over Union (IoU) with the ground truth are selected as positives, and negative samples have <0.3 IoU; (2) for BBR, positive samples have >0.4 IoU and negative samples also have <0.3 IoU; (3) the ratio of positive samples to negative samples is 1:3; (4) region proposal samples are generated with sliding windows, we use 6 sizes (W, H)∈{10, 20, 40, 80, 160, 320}, with 3 aspect ratios r E {½, 1, 2}. Totally, about 20K region proposals are generated in each input image. The data for training and testing the object detection HyperNet is directly collected as the top 200 proposals (with descending Objectness scores) obtained from a region proposal HyperNet training model.

A multi-task loss function L may be used to train the last two sibling layers (one for Objectness scoring or classification, and the other for BBR) of the two HyperNets. Mathematically, L may be defined as $$L(p,c,t,t') = L_{clf}(p,c) + acL_{bbr}(t,t') \quad \text{Eq. 1}$$

In Equation 1, in the region proposal generation, p is the probability of a region proposal being classified as an object. In object detection, p is a probability distribution over K (e.g. K=20) object classes plus 1 background class. A softmax function may be used to predict p. c is the ground truth class label, where c∈{0, 1, ..., K}. When c=u, the region proposal is classified as background. $t=\{t_x, t_y, t_w, t_h\}$ is the refined region proposal location obtained from BBR, and t' is the respective ground truth location. is a positive value to regularize the two loss functions $L_{clf}$ and $L_{bbr}$.

$L_{clf}$ may be understood as a cross-entropy/log loss, related to the negative logarithm of the probability of a true class label. $L_{bbr}$ may be defined over a tuple of true bounding box regression targets for the true class label. A variety of different loss functions may be used based on R-CNN or other approaches.

As described herein, embodiments use a Hyper Feature which combines the feature maps from multiple convolutional layers of a pre-trained CNN model to represent image or region content. In embodiments, the Hyper Feature is constructed by first reshaping 3D feature maps from different convolutional layers of a pre-trained CNN model into the same size (in width and height), then compressing them with convolution (in channels) and finally grouping them by sequential concatenation.

In some embodiments, a deep learning based region proposal solution is used and the region proposals are generated by using the feature maps from multiple convolutional layers not just one single convolutional layer of a pre-trained CNN model.

In some embodiments, a deep learning based object detection solution is used and the object classifiers are evaluated over the feature maps from multiple convolutional layers not just one single convolutional layer of a pre-trained CNN model.

In some embodiments, a unified HyperNet framework is used for processing region proposal generation and object detection, and the whole HyperNet architecture is built with an end-to-end joint training method which shares described Hyper Features across two tasks.

Embodiments described herein provide a HyperNet technology which can process region proposal generation and object detection jointly which provides leading accuracy and fast speed. This approach may be used to help to provide a software stack for object classification and detection based visual analytics applications. Such applications may include image search, scene understanding, augmented reality, surveillance, autonomous vehicles, caring for the elderly and for children, etc. This approach may also be used to provide a SW/HW stack that is complementary to camera phone platforms and provide advanced features in camera imaging modules. This approach also provides applications for other mass market products, such as camera embedded and wearable devices, e.g., smart phones, tablets, laptops, phablets, chromebooks, PCs, wearable devices, smart-TVs, game-consoles and web servers.

5. Utility

Figure 3:
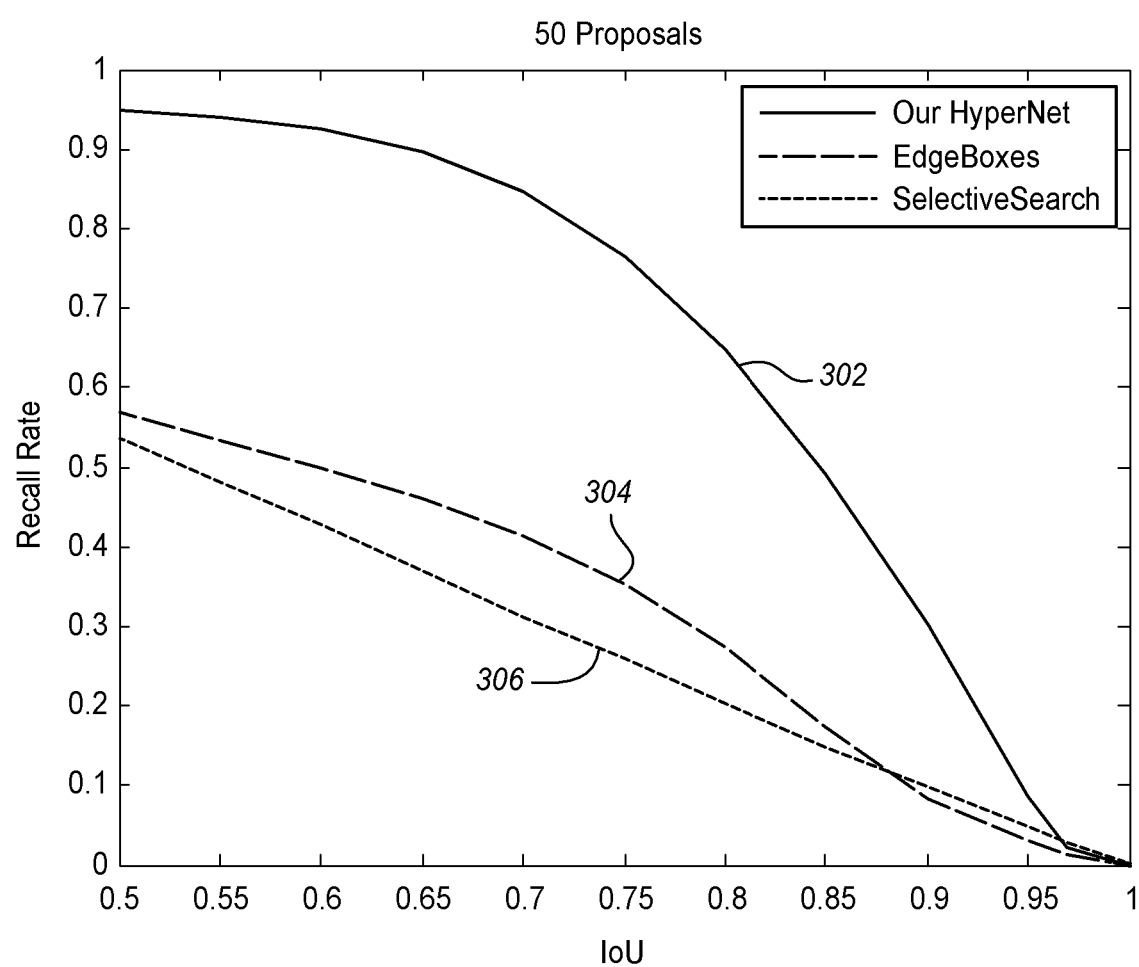
FIG. 3 is a graph of comparative results of object detection and classification with 50 proposals according to an embodiment.
Figure 4:
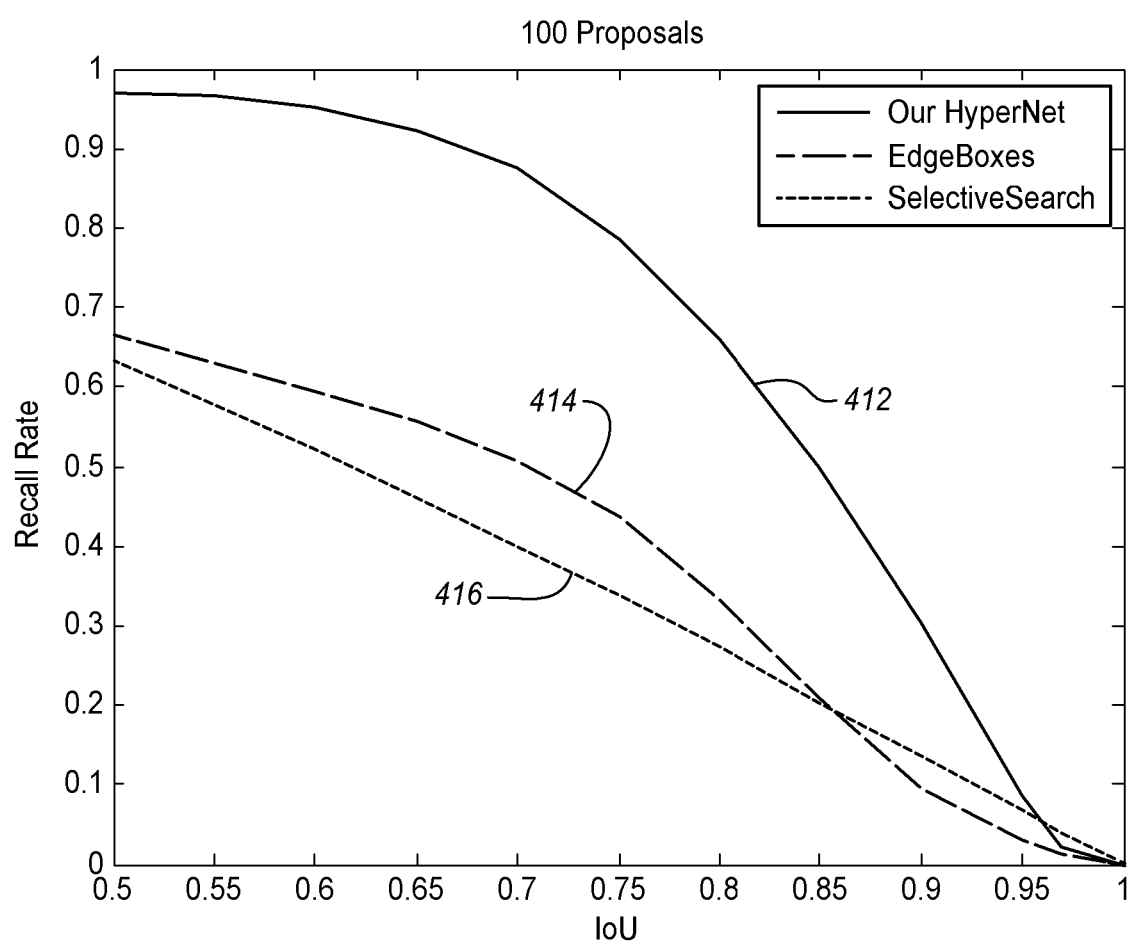
FIG. 4 is a graph of comparative results of object detection and classification with 100 proposals according to an embodiment.
Figure 5:
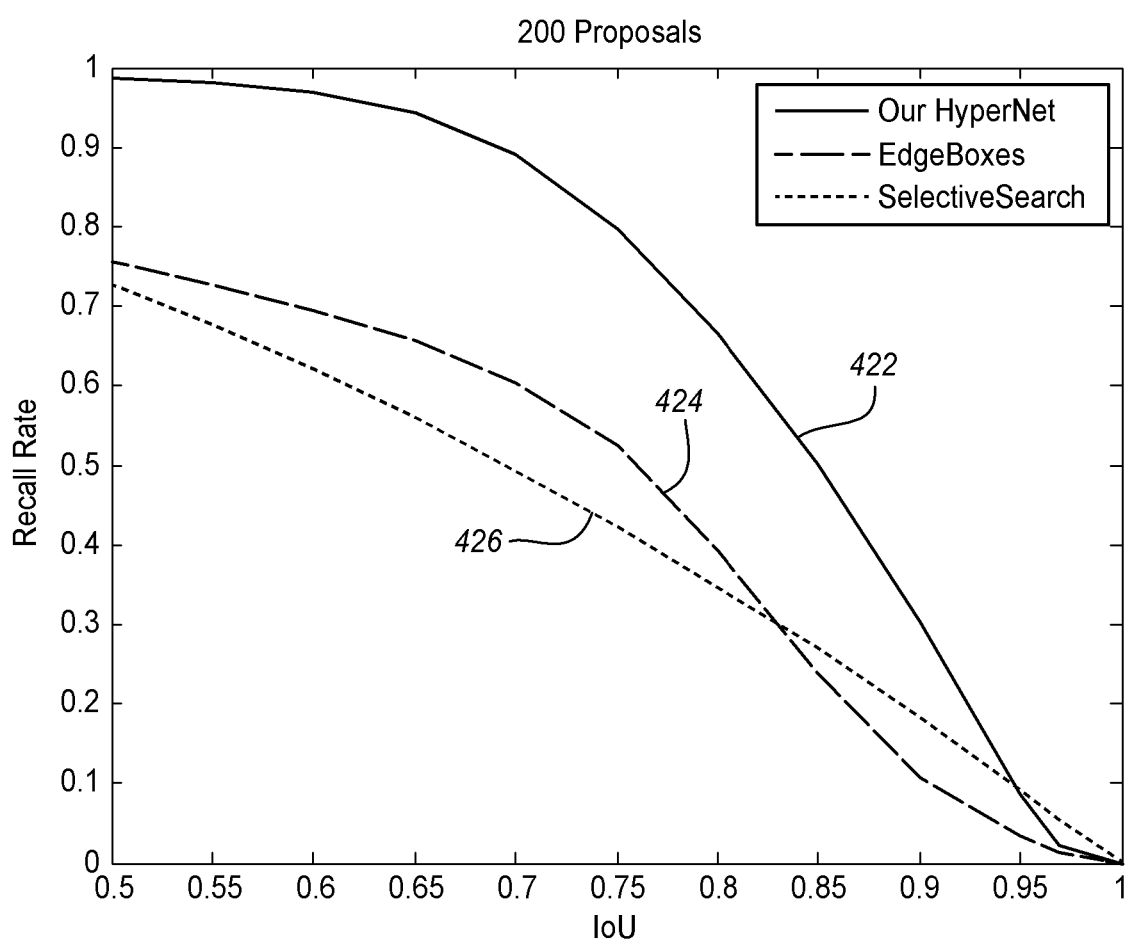
FIG. 5 is a graph of comparative results of object detection and classification with 200 proposals according to an embodiment.

FIGS. 3, 4, and 5 each represent a graph to show results of the present techniques as compared to existing leading techniques. Each graph provides a recall rate on the vertical axis and the IoU (Intersection over Union) on the horizontal axis. FIG. 3 shows comparative results for 50 object detection proposals. FIG. 4 shows comparative results for 100 proposals and FIG. 5 shows comparative results for 200 proposals. These graphs show results from the benchmark PASCAL VOC 2007 20-category object detection challenges (based on a 20 category Visual Object Classes dataset from Pattern Analysis, Statistical Modelling and Computational Learning, a European Union Network of Excellence) against an Edge Boxes (EB) method and a Selective Search (SS) method.

Accordingly, FIG. 3 shows a HyperNet result 302 with 50 proposals that has a recall rate over 0.9 at 0.5 IoU and which remains higher than the other techniques throughout the range. The other two results are an EB result 304 and an SS result 306. These produce similar results and are much lower on the recall rate scale than the HyperNet approach. FIG. 4 shows results at 100 proposals. In this case, the HyperNet curve 312 shows even better results. The maximum level stays flat and above 0.9 from 0.50 to 0.55 IoUs. The EB 314 and SS 316 results are better but still not near the HyperNet result at maximums below 0.7 and a faster down slope. FIG. 5 shows results at 200 proposals. Here the HyperNet curve 322 is even higher. While the EB curve 324 and the SS curve 326 are even better, they still lag far behind the HyperNet results.

Official evaluation tools were used following standard metrics. In object detection, the accuracy is measured as a mean Average Precision (mAP) across 20 different object categories. In region proposal generation as shown in FIGS. 3-5, the accuracy is measured as recall rates under different Intersection over Union (IoU) thresholds. In the experiments, the VGGNet was used as a pre-trained CNN model for all methods.

The Table summarizes the comparative results. It can be seen that the described HyperNet approach produced a 95% recall rate and 75.6% mAP when using only 50 region proposals. This is an increase of 2.3% mAP using far fewer region proposals, ⅙ and 1/40 of those used in the SS and EB tests. This performance can be further improved when using more region proposals as shown with the 100, and 200 regions proposal results. Compared with current best-performance region proposal methods Selective Search and Edge Boxes, the HyperNet technique demonstrated largely improved recall rates under different IoU thresholds, as shown in FIGS. 3, 4, and 5. Furthermore, the described HyperNet approach is approximately 100 times faster than R-CNN. This allows it to be used to analyze images in real-time.

TABLE

| Methods | No. of Proposals | Training data: 2007 + 2012 train&val | |
|---|---|---|---|
| | | Recall Rate (%) (IOU > 0.5) | mAP (%) |
| SS | 2000 | 93.3 | 63.1-70.0 |
| EB | 300 | 94.0 | 73.2 |
| HyperNet | 50 | 95.0 | 75.6 |
| HyperNet | 100 | 97.0 | 76.3 |
| HyperNet | 200 | 98.6 | 76.2 |

Figure 6:
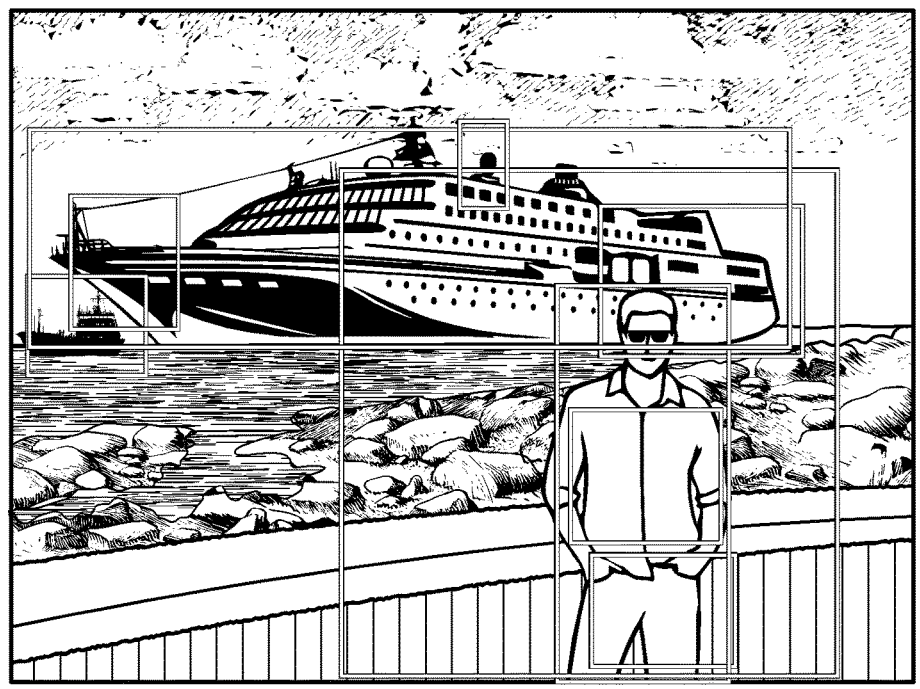
FIG. 6 is a diagram of an image with ten region proposals formed according to an embodiment.
Figure 7:
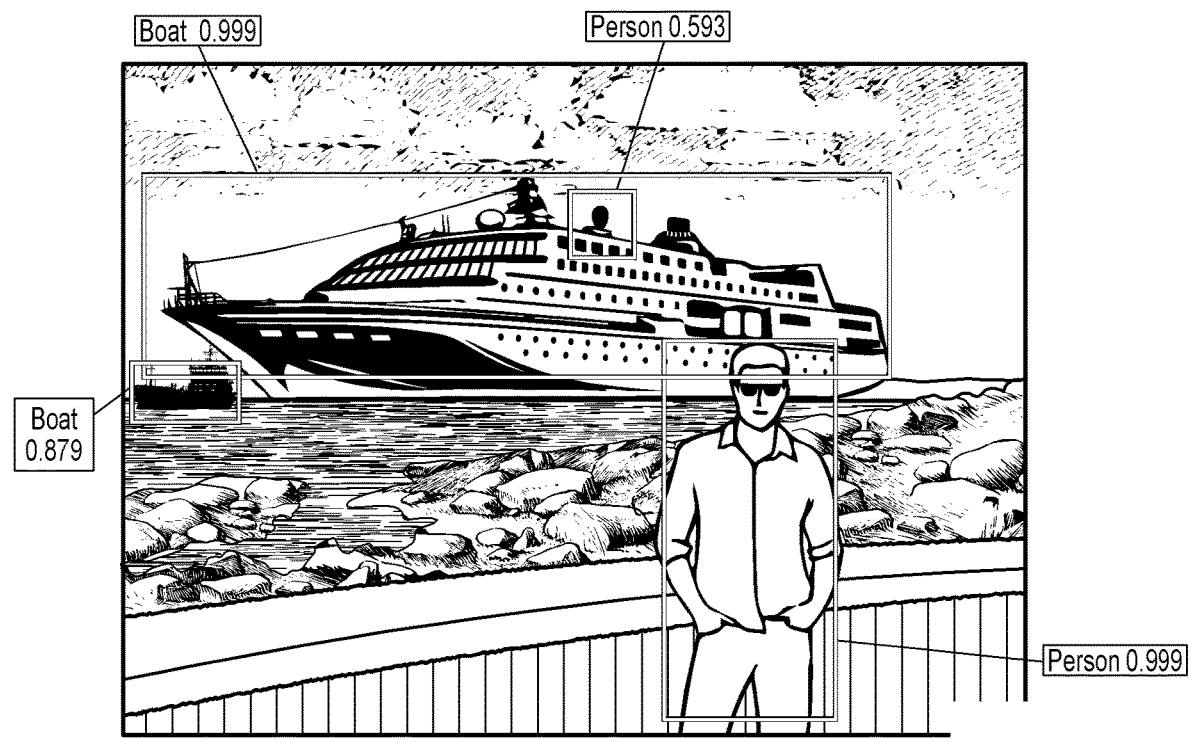
FIG. 7 is a diagram of the image of FIG. 6 with object detection on the ten regions proposals according to an embodiment.

FIGS. 6 and 7 show example results to illustrate the efficacy of the described approach. FIG. 6 shows the top ten regions proposals for an image that includes a large and small ship past a seawall with a person posing in front of the seawall. The region proposals are indicated with the rectangular boxes super-imposed over objects in the image. FIG. 7 shows the same scene after object detection has been applied to the regions proposals. Most of the boxes have been ruled out and the remaining boxes include an identifying tag to show an object classification for the corresponding box.

The leading performance of the described HyperNet approach may be attributed to many factors. Some of these factors include that the robust Hyper Feature, which is extracted with a well-designed network, is presented first. These kinds of Hyper Features combine low-level, middle-level and high-level convolutional feature maps of a pre-trained CNN model over the entire image, thus it has impressively good discrimination. Another factor is the HyperNet architecture to generate region proposals. High recall rates can be achieved with only tens of region proposals, e.g. 50. Another HyperNet architecture handles object detection. Another factor is that the unified HyperNet framework is built using an end-to-end joint training method which shares Hyper Features both for region proposal generation and object detection.

Figure 8:
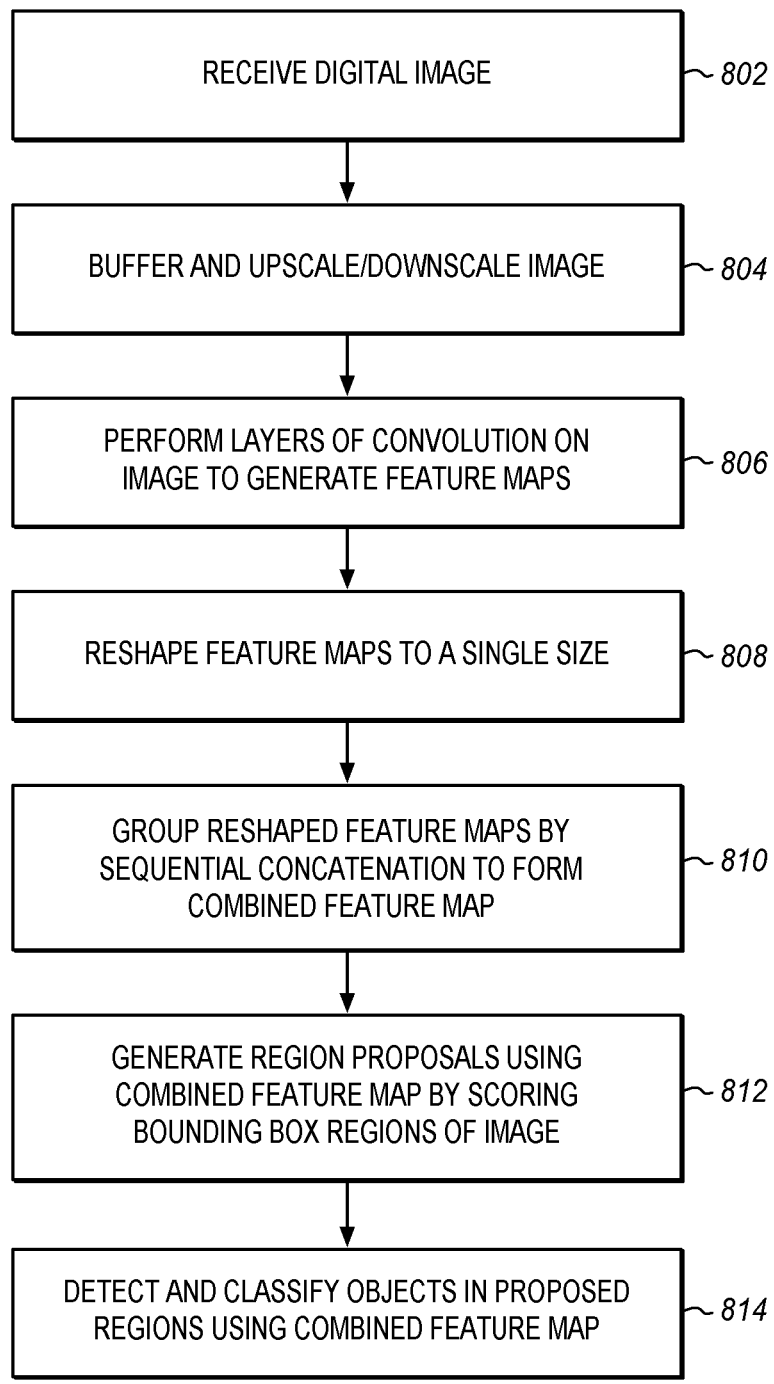
FIG. 8 is a process flow diagram of region generation and object detection according to an embodiment.

FIG. 8 is a process flow diagram of region generation and object detection using the architecture of FIG. 1. the process starts at 802 with receiving a digital image. this may be a single image or a sequence of images in a video or other type of sequence. at 804 the image is buffered. the image may also be upscaled or downscaled in different implementations. at 806 multiple different layers of convolution are performed on the image to generate feature maps.

In the described example there are three different layers of convolution each at a different level, such as the $1^{st}$, $3^{rd}$, and $5^{th}$, however other layers and more layers may be used. These three different layers generate three different feature maps with different dimensions. The convolution layers may be based on a pre-trained CNN model based on pre-classified images. The pre-training may use an end-to-end joint training method that combines region generation and object detection. FIG. 2 shows an example of such end-to-end training.

The convolutional neural network may be trained by first training for region proposals using the pre-classified images and then training for object detection using the region proposal training. The object detection training may use region of interest pooling of the region proposal images.

at 808 the feature maps are reshaped to a single size. the size includes the width and height. in the same or another process, the depth may also be modified to be the same for all of the feature maps. for larger feature maps, max pooling or another approach may be used to reduce the width and height of the feature map. for smaller feature maps, deconvolution may be used to increase the width and height of the feature map. the depth may be modified using convolution among other approaches.

at 810 the reshaped feature maps are grouped together by sequential concatenation to form a single combined feature map. at 812 region proposals are generated using the combined feature map by scoring bounding box regions of image. the region proposals may be generated by first generating a score for the detection of an object and then generating bounding box regression. the score and regression may then be combined with the combined feature map to generate region proposals. the bounding box regression may include location offsets for objects in the combined feature map.

at 814 objects in the proposed regions are detected and classified using the combined feature map. this may be done by generating classification probabilities for objects in the proposed regions and also generating bounding box regressions. the probability and regression are then combined with the combined feature map to generate an object classification in the corresponding region. the bounding box regression in this case includes location offsets for the objects in the combined feature map that depend on classification. objects are classified by evaluating object classifiers over each region proposal's feature map.

Figure 9:
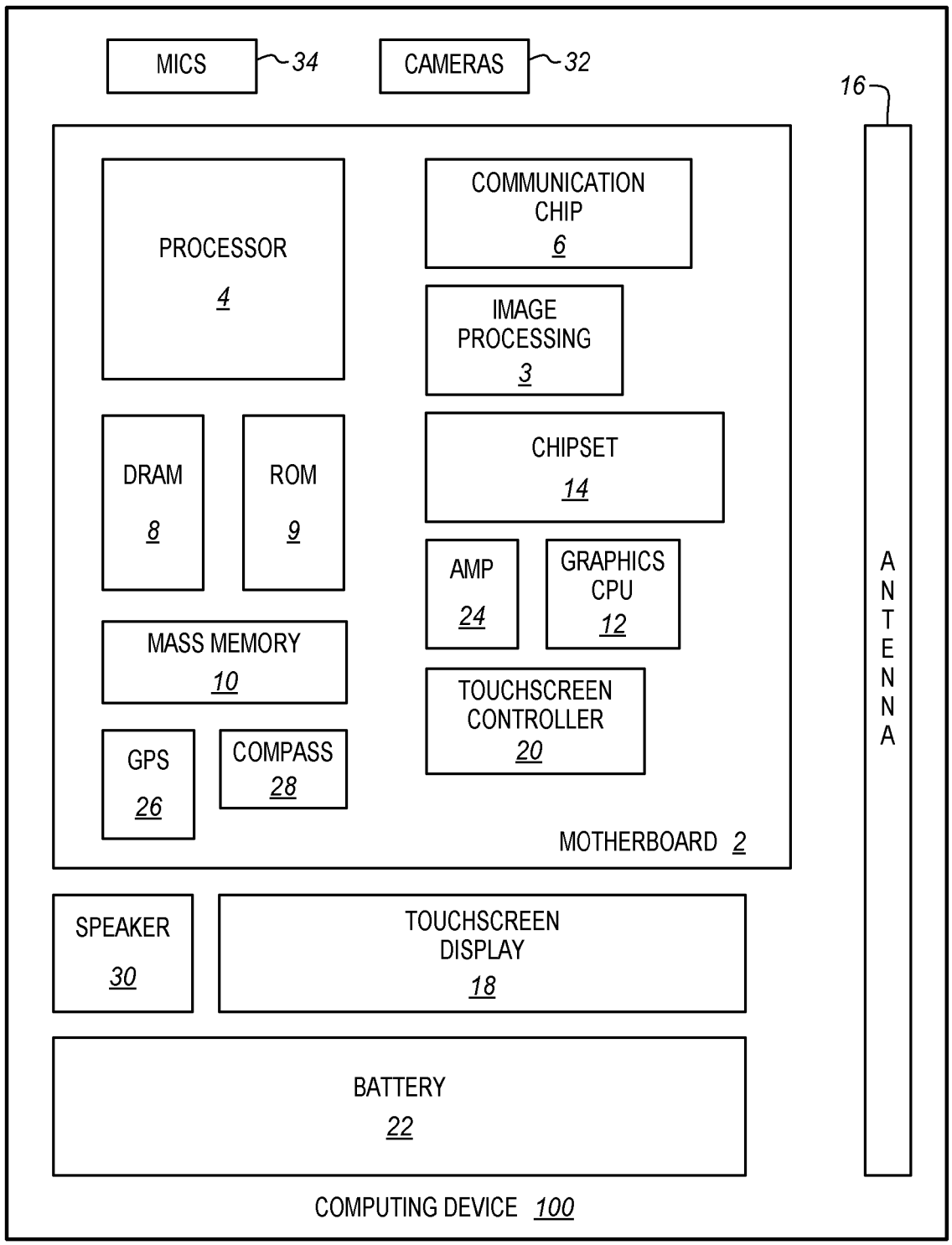
FIG. 9 is a block diagram of a computing device incorporating regions proposal and object detection and classification according to an embodiment.

FIG. 9 is a block diagram of a single computing device 100 in accordance with one implementation. The computing device 100 houses a system board 2. The board 2 may include a number of components, including but not limited to a processor 4 and at least one communication package 6. The communication package is coupled to one or more antennas 16. The processor 4 is physically and electrically coupled to the board 2.

Depending on its applications, computing device 100 may include other components that may or may not be physically and electrically coupled to the board 2. These other components include, but are not limited to, volatile memory (e.g., DRAM) 8, non-volatile memory (e.g., ROM) 9, flash memory (not shown), a graphics processor 12, a digital signal processor (not shown), a crypto processor (not shown), a chipset 14, an antenna 16, a display 18 such as a touchscreen display, a touchscreen controller 20, a battery 22, an audio codec (not shown), a video codec (not shown), a power amplifier 24, a global positioning system (GPS) device 26, a compass 28, an accelerometer (not shown), a gyroscope (not shown), a speaker 30, a camera 32, a microphone array 34, and a mass storage device (such as hard disk drive) 10, compact disk (CD) (not shown), digital versatile disk (DVD) (not shown), and so forth). These components may be connected to the system board 2, mounted to the system board, or combined with any of the other components.

The communication package 6 enables wireless and/or wired communications for the transfer of data to and from the computing device 100. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication package 6 may implement any of a number of wireless or wired standards or protocols, including but not limited to Wi-Fi (IEEE 802.11 family), WiMAX (IEEE 802.16 family), IEEE 802.20, long term evolution (LTE), Ev-DO, HSPA+, HSDPA+, HSUPA+, EDGE, GSM, GPRS, CDMA, TDMA, DECT, Bluetooth, Ethernet derivatives thereof, as well as any other wireless and wired protocols that are designated as 3G, 4G, 5G, and beyond. The computing device 100 may include a plurality of communication packages 6. For instance, a first communication package 6 may be dedicated to shorter range wireless communications such as Wi-Fi and Bluetooth and a second communication package 6 may be dedicated to longer range wireless communications such as GPS, EDGE, GPRS, CDMA, WiMAX, LTE, Ev-DO, and others.

The cameras 32 are coupled to an image processing chip 36 to perform format conversion, coding and decoding, region proposal generation and object detection and classification as described herein. The processor 4 is coupled to the image processing chip to drive the processes, set parameters, etc. The display is coupled to the processors to show the proposed regions and detected and classified objects as shown in FIGS. 1, 6 and 7.

In various implementations, the computing device 100 may be eyewear, a laptop, a netbook, a notebook, an ultrabook, a smartphone, a tablet, a personal digital assistant (PDA), an ultra mobile PC, a mobile phone, a desktop computer, a server, a set-top box, an entertainment control unit, a digital camera, a portable music player, or a digital video recorder. The computing device may be fixed, portable, or wearable. In further implementations, the computing device 100 may be any other electronic device that processes data.

Embodiments may be implemented as a part of one or more memory chips, controllers, CPUs (Central Processing Unit), microchips or integrated circuits interconnected using a motherboard, an application specific integrated circuit (ASIC), and/or a field programmable gate array (FPGA).

References to "one embodiment", "an embodiment", "example embodiment", "various embodiments", etc., indicate that the embodiment(s) so described may include particular features, structures, or characteristics, but not every embodiment necessarily includes the particular features, structures, or characteristics. Further, some embodiments may have some, all, or none of the features described for other embodiments.

In the following description and claims, the term "coupled" along with its derivatives, may be used. "Coupled" is used to indicate that two or more elements co-operate or interact with each other, but they may or may not have intervening physical or electrical components between them.

As used in the claims, unless otherwise specified, the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

The following examples pertain to further embodiments. The various features of the different embodiments may be variously combined with some features included and others excluded to suit a variety of different applications. Some embodiments pertain to a method that includes receiving a digital image, buffering the image, performing a plurality of layers of convolution on the image to generate a plurality of feature maps, reshaping the plurality of feature maps to a single size, grouping the reshaped feature maps by sequential concatenation to form a combined feature map, generating a plurality of region proposals using the combined feature map by scoring a plurality of bounding box regions of the image, and detecting and classifying objects in the proposed regions using the feature maps.

In further embodiments the convolutional layers are from a pre-trained convolutional neural network model based on pre-classified images.

Further embodiments include pre-training the convolutional neural network using an end-to-end joint training method that combines region generation and object detection.

In further embodiments performing convolution comprises performing three different layers of convolution of different levels.

In further embodiments performing convolution comprises generating feature maps having different dimensions and wherein reshaping comprises reshaping each of the plurality of feature maps to a single width and height2. The method of claim 1, wherein the convolutional layers are from a pre-trained convolutional neural network model based on pre-classified images.

Further embodiments include pre-training the convolutional neural network using an end-to-end joint training method that combines region generation and object detection.

In further embodiments performing convolution comprises performing three different layers of convolution of different levels.

In further embodiments performing convolution comprises generating feature maps having different dimensions and wherein reshaping comprises reshaping each of the plurality of feature maps to a single width and height.

In further embodiments reshaping comprises max pooling to reduce the width and height of at least one feature map.

In further embodiments reshaping comprises deconvolution to increase the width and height of at least one feature map.

In further embodiments reshaping comprises compressing each of the feature maps with convolution to a single depth.

In further embodiments classifying objects comprises evaluating object classifiers over each of the plurality of feature maps.

Further embodiments include generating a reduced combined feature map using region of interest pooling on the combined feature map before generating the regions proposals and before detecting and classifying objects.

In further embodiments generating a plurality of regions proposals comprises generating a score for the detection of an object and generating a bounding box regression and combining the score and the regression with the feature maps to generate a region proposal, wherein the bounding box regression includes a location offset for the object in the feature map.

In further embodiments detecting and classifying objects comprises generating a classification probability for objects in the proposed regions and a bounding box regression and combining the probability and the regression with the feature maps to generate an object classification in a region, wherein the bounding box regression includes a location offset for the object in the feature map that depends on the classification.

Further embodiments include training the convolutional neural network by first training for region proposals using the pre-classified images and then training for object detection using the regions proposal training.

In further embodiments training the object detection comprises region of interest pooling of the region proposal images.

Some embodiments pertain to an apparatus that includes a feature extraction network to receive a digital image, to buffer the image, to perform a plurality of layers of convolution on the image to generate a plurality of feature maps, to reshape the plurality of feature maps to a single size and the group the reshaped feature maps by sequential concatenation to a single size, a region proposal generation net to generate plurality of region proposals using the combined feature map by scoring a plurality of bounding box regions of the image, and an object detection net to detect and classify objects in the proposed regions using the feature maps.

In further embodiments the region proposals net generates a plurality of regions proposals by generating a score for the detection of an object and generating a bounding box regression and combining the score and the regression with the feature maps to generate a region proposal, wherein the bounding box regression includes a location offset for the object in the feature map.

In further embodiments the object detection net detects and classifies objects by generating a classification probability for objects in the proposed regions and a bounding box regression and combining the probability and the regression with the feature maps to generate an object classification in a region, wherein the bounding box regression includes a location offset for the object in the feature map that depends on the classification.

Some embodiments pertain to a computer-readable medium having instructions that when operated on by the computer cause the computer to perform operations that include receiving a digital image, buffering the image, performing a plurality of layers of convolution on the image to generate a plurality of feature maps, reshaping the plurality of feature maps to a single size, grouping the reshaped feature maps by sequential concatenation to form a combined feature map, generating a plurality of region proposals using the combined feature map by scoring a plurality of bounding box regions of the image, detecting and classifying objects in the proposed regions using the feature maps.

In further embodiments the convolutional layers are from a pre-trained convolutional neural network model based on pre-classified images.

Further embodiments include pre-training the convolutional neural network using an end-to-end joint training method that combines region generation and object detection.

Some embodiments pertain to a system that includes a camera to capture a digital image, an image buffer to buffer the image, a feature extraction network to receive the buffered image, to perform a plurality of layers of convolution on the image to generate a plurality of feature maps, to reshape the plurality of feature maps to a single size and the group the reshaped feature maps by sequential concatenation to a single size, a region proposal generation net to generate plurality of region proposals using the combined feature map by scoring a plurality of bounding box regions of the image, an object detection net to detect and classify objects in the proposed regions using the feature maps, and a display to show proposed regions and detected objects.

What is claimed is:

1. A method for classifying objects within digital images, the method comprising:
   performing a plurality of layers of convolution on a digital image to generate a plurality of feature maps;
   reshaping the plurality of feature maps to a single size;
   grouping the reshaped feature maps by sequential concatenation to form a combined feature map;
   generating a plurality of proposed regions using the combined feature map by scoring a plurality of bounding box regions of the digital image; and
   detecting and classifying one or more objects in one or more of the proposed regions using the feature maps by:
   generating a classification probability for an object included in the one or more objects,
   generating a bounding box regression for the object, and
   combining the classification probability and the bounding box regression to generate an object classification in a region, wherein the bounding box regression includes a location offset for the object in the combined feature map, the location offset depending on the classification.

2. The method of claim 1, wherein the convolutional layers are associated with a pre-trained convolutional neural network model based on pre-classified images.

3. The method of claim 2, further including generating the pre-trained convolutional neural network by pre-training a convolutional neural network using end-to-end joint training that combines region generation and object detection.

4. The method of claim 2, further including training the convolutional neural network by first training for proposed regions using the pre-classified images and then training for object detection using the training for the proposed regions.

5. The method of claim 4, wherein the training for the object detection includes region of interest pooling of the proposed regions.

6. The method of claim 1, wherein the performing of the plurality of layers of convolution includes performing three different layers of convolution.

7. The method of claim 1, wherein respective ones of the feature maps have different dimensions and wherein the reshaping includes reshaping the respective ones of the plurality of feature maps to a single width and height.

8. The method of claim 7, wherein the reshaping includes max pooling to reduce the width and height of at least one of the respective feature maps.

9. The method of claim 7, wherein the reshaping includes deconvolution to increase the width and height of at least one of the respective feature maps.

10. The method of claim 1, wherein the reshaping includes compressing respective ones of the feature maps to a single depth.

11. The method of claim 1, wherein the detecting and classifying of the one or more objects includes evaluating object classifiers over respective ones of the plurality of feature maps.

12. The method of claim 1, further including generating a reduced combined feature map using region of interest pooling on the combined feature map before generating the proposed regions and before the detecting and classifying of the one or more objects.

13. The method of claim 1, wherein the generating of the plurality of proposed regions includes generating a score for the object and combining the score and the bounding box regression with the feature maps to generate one of the proposed regions.

14. An apparatus comprising:
at least one memory;
instructions; and
one or more processors to execute the instructions to:
  perform a plurality of layers of convolution on a digital image to generate a plurality of feature maps;
  reshape the plurality of feature maps to a single size;
  group the reshaped feature maps by sequential concatenation to generate a combined feature map;
  generate a plurality of proposed regions using the combined feature map by:
    scoring a plurality of bounding box regions of the digital image, a score for a corresponding bounding box region being indicative of a probability of the corresponding bounding box region including an object; and
    combining the score and the bounding box regression with the feature maps to generate a proposed region of the plurality of proposed regions; and
  detect and classify at least one object within at least one region by:
    generating (i) a classification probability for objects in the proposed regions and (ii) a bounding box regression, and
    combining the probability and the bounding box regression to generate an object classification in a region, wherein the bounding box regression includes a location offset for the object in the feature map that depends on the classification.

15. A non-transitory computer-readable medium comprising instructions that when executed cause one or more processors to at least:
perform a plurality of layers of convolution on a digital image to generate a plurality of feature maps;
reshape the plurality of feature maps to a single size;
group the reshaped feature maps by sequential concatenation to form a combined feature map;
generate a plurality of proposed regions using the combined feature map by scoring a plurality of bounding box regions of the digital image; and
detect and classify objects in the proposed regions using the feature maps by:
  generating a classification probability for objects in the proposed regions and a bounding box regression, and
  combining the probability and the bounding box regression to generate an object classification in a region, wherein the bounding box regression includes a location offset for the object in the feature map that depends on the classification.

16. The non-transitory computer-readable medium of claim 15, wherein the convolutional layers are from a pre-trained convolutional neural network model based on pre-classified images.

17. The non-transitory computer-readable medium of claim 16, wherein the instructions cause the one or more processors to pre-train the convolutional neural network using an end-to-end joint training method that combines region generation and object detection.

18. A system comprising:
a camera to capture a digital image;
an image buffer to buffer the digital image;
instructions;
one or more processors to execute the instructions to:
  perform a plurality of layers of convolution on the digital image to generate a plurality of feature maps that includes at least a first feature map, a second feature map, and a third feature map,
  reshape the plurality of feature maps to a single size by:
    max pooling the first feature map to reduce a width and height and generate a pooled feature map,
    compressing the pooled feature map to change a depth and generate a first reshaped feature map,
    deconvoluting the second feature map to increase a width and height and generate a deconvoluted feature map,
    compressing the deconvoluted feature map to change a depth and generate a second reshaped feature map,
    compressing a third feature map, without max pooling or deconvoluting the third feature map, to generate a third reshaped feature map, wherein each of the first, second, and third reshaped feature map has the single size, and
    grouping the first, second, and third reshaped feature maps by sequential concatenation,
  generate plurality of proposed regions using the combined feature map by scoring a plurality of bounding box regions of the digital image, and
  detect and classify objects in the proposed regions using the feature maps; and
a display to show proposed regions and detected objects.

19. An apparatus comprising:
at least one memory;
instructions; and
one or more processors to execute the instructions to:
  perform a plurality of convolutions on a digital image to generate a plurality of feature maps;
  reshape the plurality of feature maps to a single size;
  group the reshaped feature maps by sequential concatenation to generate a combined feature map;
  generate a plurality of proposed regions using the combined feature map by scoring a plurality of bounding box regions of the digital image; and
  detect and classify one or more objects in one or more of the proposed regions using the feature maps by:
    generating a classification probability for an object included in the one or more objects, generating a bounding box regression for the object, and combining the classification probability and the bounding box regression to generate an object classification in a region, the bounding box regression including a location offset for the object in the combined feature map, the location offset dependent on the classification.

20. The apparatus of claim 19, wherein to perform the plurality of convolutions, the one or more processors are to generate feature maps having different dimensions, and to reshape the plurality of feature maps, the one or more processors are to reshape respective ones of the plurality of feature maps to a single width and height.

* * * * *

UNITED STATES PATENT AND TRADEMARK OFFICE
CERTIFICATE OF CORRECTION

| | | |
|---|---|---|
| PATENT NO. | : 11,244,191 B2 | |
| APPLICATION NO. | : 16/070483 | |
| DATED | : February 8, 2022 | |
| INVENTOR(S) | : Anbang Yao et al. | |

It is certified that error appears in the above-identified patent and that said Letters Patent is hereby corrected as shown below:

In the Claims

In Claim 1 at Column 14, Line 39, Delete "the feature maps" and insert --the combined feature map--.

In Claim 14 at Column 15, Lines 55-56, Insert --combined-- between "the" and "feature map".

In Claim 15 at Column 16, Line 2, Delete "the feature maps" and insert --the combined feature map--.

In Claim 15 at Column 16, Lines 8-9, Insert --combined-- between "the" and "feature map".

In Claim 18 at Column 16, Line 50, Delete "the feature maps;" and insert --the combined feature map;--.

In Claim 19 at Column 16, Line 65, Delete "the feature maps" and insert --the combined feature map--.

Signed and Sealed this
Fifteenth Day of October, 2024

Katherine Kelly Vidal
*Director of the United States Patent and Trademark Office*